US008913584B2

(12) United States Patent
Wang et al.

(10) Patent No.: US 8,913,584 B2
(45) Date of Patent: Dec. 16, 2014

(54) METHOD AND APPARATUS FOR SOUNDING REFERENCE SIGNAL RESOURCE ALLOCATION IN LONG TERM EVOLUTION SYSTEM

(75) Inventors: Yong Wang, Shenzhen (CN); Yongfang Zhou, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 147 days.

(21) Appl. No.: 13/700,484

(22) PCT Filed: Jun. 9, 2011

(86) PCT No.: PCT/CN2011/075496
§ 371 (c)(1),
(2), (4) Date: Nov. 28, 2012

(87) PCT Pub. No.: WO2011/153944
PCT Pub. Date: Dec. 15, 2011

(65) Prior Publication Data
US 2013/0070725 A1    Mar. 21, 2013

(30) Foreign Application Priority Data

Jun. 10, 2010    (CN) .......................... 2010 1 0199599

(51) Int. Cl.
*H04W 72/04*    (2009.01)
*H04L 5/00*    (2006.01)

(52) U.S. Cl.
CPC ......... *H04W 72/0453* (2013.01); *H04L 5/0048* (2013.01); *H04W 72/0466* (2013.01); *H04W 72/044* (2013.01)
USPC ........... 370/330; 370/280; 370/336; 370/252; 370/328; 370/329; 370/480; 370/482

(58) Field of Classification Search
CPC .............. H04L 5/0048; H04L 27/2613; H04L 25/0226; H04L 25/0228; H04W 72/04; H04W 52/24; H04J 13/0074
USPC ......... 370/252, 328, 329, 280, 480, 482, 330, 370/336
See application file for complete search history.

(56) References Cited

U.S. PATENT DOCUMENTS

2011/0261716 A1* 10/2011 Kim et al. ...................... 370/252
2012/0008588 A1*  1/2012 Chung et al. .................. 370/329

FOREIGN PATENT DOCUMENTS

| CN | 101384055 A | 3/2009 |
|----|---|---|
| CN | 101447826 A | 6/2009 |
| WO | 2009/115563 A1 | 9/2009 |

OTHER PUBLICATIONS

3GPP TSG Ran WG1 Mee4ting #51 R1-074806, "Assignment Scheme for Sounding Reference Signals in E-UTRA Uplink," 2007, NTT DoCoMo, 4 pages.
PCT International Search Report for PCT/CN2011/075496 mailed Sep. 15, 2011 (3 pages).

\* cited by examiner

*Primary Examiner* — Jamal Javaid
*Assistant Examiner* — Will Lin
(74) *Attorney, Agent, or Firm* — Sutherland Asbill & Brennan LLP

(57) ABSTRACT

The present invention provides a method for Sounding Reference Signal (SRS) resource allocation in a Long Term Evolution (LTE) system, including: a system side setting different SRS transmission periods to correspond to different cycle shifts, and during the process of allocating SRS resources for user equipment (UE), setting a cycle shift adopted by the UE according to the SRS transmission period adopted by the UE. The method and apparatus of the present invention realize simple and effective SRS resource multiplexing with high utilization ratio among UEs with different periods.

16 Claims, 3 Drawing Sheets

METHOD AND APPARATUS FOR SOUNDING REFERENCE SIGNAL RESOURCE ALLOCATION IN LONG TERM EVOLUTION SYSTEM

CROSS REFERENCE TO RELATED APPLICATIONS

This application claims the priority benefit of PCT/CN2011/075496 filed on Jun. 9, 2011 and Chinese Application No. 201010199599.8 filed on Jun. 10, 2010. The contents of these applications are hereby incorporated by reference in their entirety.

TECHNICAL FIELD

The present invention relates to the technical field of wireless communication system, and in particular, to a method and apparatus for allocating SRS (Sounding Reference Signal) resources in a LTE (Long Term Evolution) system.

BACKGROUND ART

In the Long Term Evolution (LTE) system, Sounding Reference Signal (SRS) may be used to perform LTE uplink scheduling, synchronization and power control, so SRS plays an important role in the LTE system. The minimum bandwidth for SRS resource allocation is four RBs (Resource Blocks), each of which is composed of 12 subcarriers on the frequency domain, and the total number of RBs of SRS bandwidth resources is determined collectively by system bandwidth, the bandwidth occupied by a PUCCH (Physical Uplink Control Channel) and the bandwidth occupied by a PRACH (Physical Random Access Channel). It is regulated in the LTE protocol that the SRS signal can only be transmitted in the last symbol of the uplink conventional subframe, and as for TDD (Time Division Duplexing), if the UpPTS (Uplink Pilot Time Slot) have two symbols, then the SRS signal can be transmitted in two symbols therein at most. The SRS resources have a Tree structure in the frequency domain so as to indicate the resources that can be allocated. Such a tree structure is divided into four layers ($B_0$, $B_1$, $B_2$, $B_3$), the bandwidth of the node on each layer is a multiple of four RBs, and each parent node is a multiple of its child node, and the multiple is the number of child nodes contained by the parent node. As shown in FIG. 1, one parent node of layer $B_0$ corresponds to two child nodes of layer $B_1$, each child node of layer $B_1$ also corresponds to two child nodes of layer $B_2$ as a parent node, and each child node of layer $B_2$ further corresponds to three child nodes of layer $B_3$ as a parent node (how many child nodes a parent node includes is determined by the SRS bandwidth configuration of the cell), and the bandwidth values of all nodes in the same layer are the same, the root node, i.e. the first layer (layer $B_0$ in the figure) is the SRS bandwidth of the whole system, and the node bandwidth granularity of the last layer is four RBs.

The SRS sequence is mapped to the subcarrier of the corresponding bandwidth by adopting a Comb structure (i.e. the SRS sequences are either all mapped to odd-number subcarriers, or all mapped to even-number subcarriers, thus forming a Comb structure). As the subcarrier of $RB_0$ shown in FIG. 1, the black positions represent even-number subcarriers, while the white positions represent odd-number subcarriers. One SRS tree can be divided into an odd tree (composed of all subcarriers at white positions in the SRS tree in FIG. 1) and an even tree (composed of all subcarriers at black positions in the SRS tree in FIG. 1) by this Comb structure. The starting position of the SRS sequence of the UE on the odd tree in the frequency domain is an odd-number subcarrier, and the whole sequence is only distributed on odd-number subcarriers; the starting position of the SRS sequence of the UE on the even tree in the frequency domain is an even-number subcarrier, and the whole sequence is only distributed on even-number subcarriers. Therefore, the length of the SRS sequence of the UE is half of the number of all subcarriers within the allocated SRS bandwidth. The continuous length of bandwidth in each layer ($B_0$, $B_1$, $B_2$, $B_3$) in FIG. 1 can be considered as one node, for example, the SRS odd tree corresponding to layer $B_0$ has only one node (meanwhile the even tree also has one node), and the SRS odd tree corresponding to layer $B_1$ has only two nodes, and so forth.

It is regulated in the LTE protocol that the SRS transmission period of the UE has eight types, which are {2,5,10,20, 40,80,160,32} specifically, with the unit of ms. The cell specialized subframe offset under the corresponding cell specialized subframe configuration period is the subframe that can be used by the UE of the cell for transmitting SRS. Since the SRS bandwidth resources are limited and the SRS bandwidth of the whole system cannot be allocated to each UE, in order that the base station obtains the channel information of the frequency band that is not allocated to the UE, it is allowed in the LTE protocol that the UE obtains the channel information of other frequency bands by means of frequency hopping. Of course, the UE can also adopt non-frequency hopping manners. Each UE is configured with one frequency hopping bandwidth, and whether the UE performs frequency hopping on the SRS bandwidth of the whole cell or on part of the bandwidth or UE doesn't perform frequency hopping is determined according to the configured frequency hopping bandwidth and the size of bandwidth for the UE transmitting the SRS.

According to the above various usable technical conditions, the SRS resource allocation may be implemented in many different manners, and meanwhile due to the influence of tree structure, frequency hopping and different SRS transmission periods and so on, SRS resource allocation also has many limitations. For example, as for the odd tree of the SRS tree, the premise that its parent tree can be allocated to the UE is that none of its all child nodes has been allocated yet, that is, as long as any one of the child nodes of the parent node has been allocated, this parent node cannot be allocated as a whole, but its child nodes, as a whole, are allocated to a UE with the same bandwidth as that of the child nodes; as for the odd tree of the SRS tree, if UEs with various SRS transmission periods are included, the frequency hopping of each UE will not be synchronous due to different periods, which will lead to overlapping of bandwidths for different UEs transmitting SRS, thus causing interference. If UEs with different periods are transmitted on different subframe offsets, since there are various UE SRS period configurations, and the available subframe offsets are not sufficient, and more importantly there are too many configuration types of subframe offsets, the resource multiplexing process of SRS will be very complicated; likewise, there also exists the same problem for the even tree of the SRS tree.

SUMMARY OF THE INVENTION

The technical problem to be solved in the present invention is to provide a method and apparatus for allocating SRS resources in a LTE system, so as to achieve simple and effective SRS resource multiplexing with high utilization ratio among UEs with different periods.

In order to solve the above technical problem, the present invention provides a method for SRS (Sounding Reference Signal) resource allocation in a LTE (Long Term Evolution) system, comprising the following steps of:

a system side setting different SRS transmission periods to correspond to different cycle shifts, and during a process of allocating SRS resources for user equipment (UE), setting a cycle shift adopted by the UE according to the SRS transmission period adopted by the UE.

Preferably, in the step of setting a cycle shift adopted by the UE according to the SRS transmission period adopted by the UE, for the UEs with closer SRS transmission periods, an interval for configuring corresponding cycle shifts thereof is larger.

Preferably, the method further comprises: determining resources on an SRS odd tree or on an SRS even tree allocated for the UE according to frequency hopping information of the UE within an SRS frequency band resource range of a cell where the UE is located, the frequency hopping information of the UE being used to indicate whether the UE is a full-frequency hopping UE or a partial-frequency hopping UE, or non-frequency hopping UE; wherein: the SRS odd tree refers to SRS frequency band resources with subcarrier numbers being odd; the SRS even tree refers to SRS frequency band resources with subcarrier numbers being even; the full frequency hopping means that the UE performs frequency hopping within the SRS frequency band resource range of the cell where the UE is located; the partial-frequency hopping means that the UE only performs frequency hopping within part of the SRS frequency band resource range of the cell where the UE is located; the non-frequency hopping means that a SRS frequency band resource position in each transmission of the UE does not change.

Preferably, the step of determining resources on an SRS odd tree or on an SRS even tree allocated for the UE according to frequency hopping information of the UE comprises: if the system side judges that UEs in the system are all full-frequency hopping UEs, or UEs in the system are all non-full frequency hopping UEs, determining resources on an SRS odd tree or on an SRS even tree allocated for the UE according to remaining SRS frequency band resources of the cell where the UE is located; the non-full frequency hopping UEs comprise: partial-frequency hopping UEs and/or non-frequency hopping UEs; if the system side judges that the system has both full-frequency hopping UEs and non-full frequency hopping UEs, allocating resources on different SRS trees for the full-frequency hopping UEs and non-full frequency hopping UEs respectively.

Preferably, said allocating resources on different SRS trees for the full-frequency hopping UEs and non-full frequency hopping UEs respectively means: allocating resources on an SRS even tree for the full-frequency hopping UEs, and allocating resources on an SRS odd tree for the partial-frequency hopping UEs and non-frequency hopping UEs; or, allocating resources on an SRS odd tree for the full-frequency hopping UEs, and allocating resources on an SRS even tree for the partial-frequency hopping UEs and non-frequency hopping UEs.

Preferably, said determining resources on an SRS odd tree or on an SRS even tree allocated for the UE according to remaining SRS frequency band resources of the cell where the UE is located means: if the system side judges that among the remaining SRS frequency band resources of the cell, the resources on the SRS odd tree are more than the resources on the SRS even tree, allocating the resources on the SRS odd tree for the UE; if among the remaining SRS frequency band resources of the cell, the resources on the SRS even tree are more than the resources on the SRS odd tree, allocating the resources on the SRS even tree for the UE.

Preferably, the method further comprises: determining an SRS bandwidth occupied by the UE; after allocating the SRS tree for the UE, searching for available resources for the UE on the SRS tree allocated to the UE in any one of the following ways according to the SRS bandwidth of the UE: frequency division, frequency division and time division, frequency division and code division, and frequency division, time division and code division; allocating the available resources searched out to the UE.

Preferably, said searching for available resources for the UE on the SRS tree allocated to the UE by way of frequency division comprises: on the SRS tree of the UE corresponding to a certain subframe offset, starting from a layer with the same SRS bandwidth as that of the UE, searching for idle resources on the SRS tree in a preset order according to the index of each node on the SRS tree, and if any idle resource is searched out, using the idle resource as available resource.

Preferably, said searching for available resources for the UE on the SRS tree allocated to the UE by way of frequency division and code division comprises: if no available resource is searched out by way of the frequency division, then on the SRS tree of the UE corresponding to a certain subframe offset, starting from a layer with the same SRS bandwidth as that of the UE, searching for non-idle resources on the SRS tree in a preset order according to the index of each node on the SRS tree, and the UE occupying the resource and the current UE having the same SRS bandwidth and different periods, and different periods corresponding to different cycle shifts; if the non-idle resource is searched out, using the non-idle resource as the available resource.

Preferably, said searching for available resources for the UE on the SRS tree allocated to the UE by way of frequency division and time division comprises: when no available resource is found by way of the frequency division on the SRS tree of the UE corresponding to a certain subframe offset, selecting a next subframe offset, and continuing to search for available resources by way of frequency division and/or code division;

said searching for available resources for the UE on the SRS tree allocated to the UE by way of frequency division, time division and code division comprises:

when no available resource is found by way of the frequency division and code division on the SRS tree of the UE corresponding to a certain subframe offset, selecting a next subframe offset, and continuing to search for available resources by way of the frequency division and/or code division.

Preferably, if no available resource that can be allocated to the UE is searched out, the SRS bandwidth of the UE is decreased, and available resources are searched for the UE with a newly determined SRS bandwidth in any one of the following ways: frequency division, frequency division and time division, frequency division and code division, and frequency division, time division and code division, and the available resources searched out are allocated to the UE.

Preferably, the step of determining an SRS bandwidth occupied by the UE comprises: allocating an SRS bandwidth to the UE according to channel quality of the UE, and the SRS bandwidth allocated to the UE with better channel quality being larger.

Preferably, the step of the SRS bandwidth allocated to the UE with better channel quality being larger comprises:

setting thresholds of Signal to Interference plus Noise Ratio (SINR) measurement values: SinrBad, SinrNormal, SinrGood, wherein SinrBad<SinrNormal<SinrGood, and comparing the SINR measurement value of the UE with the thresholds so as to determine the SRS bandwidth thereof:

when SINR≤SinrBad, then $B_{SRS}=3$, which indicates that the SRS bandwidth allocated to the UE is the bandwidth of a resource node on a fourth layer of the SRS tree in the cell where the UE is located;

when SinrBad<SINR≤SinrNormal, then $B_{SRS}=2$, which indicates that the SRS bandwidth allocated to the UE is the bandwidth of a resource node on a third layer of the SRS tree in the cell where the UE is located;

when SinrNormal<SINR≤SinrGood, then $B_{SRS}=1$, which indicates that the SRS bandwidth allocated to the UE is the bandwidth of a resource node on a second layer of the SRS tree in the cell where the UE is located;

when SinrGood<SINR, then $B_{SRS}=0$, which indicates that the SRS bandwidth allocated to the UE is the bandwidth of a resource node on a first layer of the SRS tree in the cell where the UE is located;

wherein, the bandwidth of the resource node on the first layer>the bandwidth of the resource node on the second layer>the bandwidth of the resource node on the third layer>the bandwidth of the resource node on the fourth layer.

In order to solve the above technical problem, the present invention further provides an apparatus for allocating SRS resources in a LTE system, comprising:

a setting unit, configured to: set different SRS transmission periods to correspond to different cycle shifts; and a resource allocating unit, configured to: during a process of allocating SRS resources for user equipment (UE), set a cycle shift adopted by the UE according to the SRS transmission period adopted by the UE and a corresponding relationship between the SRS transmission period and the cycle shift set by the setting unit.

Preferably, the resource allocating unit is further configured to: after setting the cycle shift adopted by the UE for the UE, determine resources on an SRS odd tree or on an SRS even tree allocated for the UE according to frequency hopping information of the UE within an SRS frequency band resource range of a cell where the UE is located, wherein the frequency hopping information of the UE is used to indicate whether the UE is a full-frequency hopping UE or a partial-frequency hopping UE, or non-frequency hopping UE.

Preferably, the resource allocating unit is further configured to: after allocating a SRS tree for the UE, search for available resources for the UE on the SRS tree allocated to the UE in any one of the following ways according to the SRS bandwidth of the UE: frequency division, frequency division and time division, frequency division and code division, and frequency division, time division and code division, and allocate the available resources searched out to the UE.

Preferably, the apparatus further comprises: a bandwidth setting unit, configured to: allocate an SRS bandwidth to the UE according to channel quality of the UE, the SRS bandwidth allocated to the UE with better channel quality being larger, and send the SRS bandwidth allocated to the UE to the resource allocating unit.

With the SRS resource multiplexing method as described in the present invention, the SRS resources allocated among UEs will not conflict, i.e. interference will not be caused for each other, and UEs with different SRS transmission periods can be simply multiplexed together without occurrence of conflict; the process of resource multiplexing is also very simple, the utilization ratio of the entire SRS resources is also very high, and the method can be applied to both of the two Duplex modes, FDD and TDD, in the LTE system.

PREFERRED EMBODIMENTS OF THE PRESENT INVENTION

Figure 1:
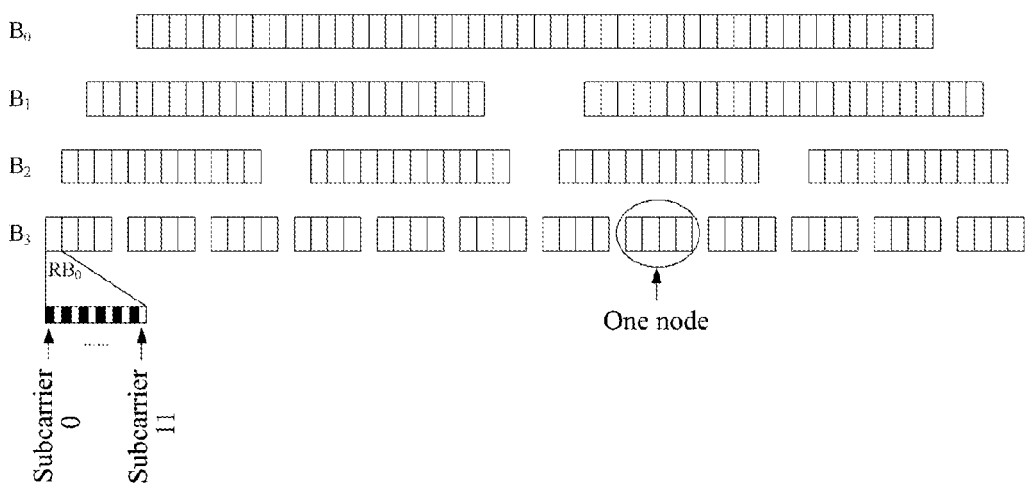
FIG. 1 illustrates an SRS resource tree under SRS bandwidth configuration.

Some conceptions in this text will be introduced firstly: SRS odd tree refers to: SRS frequency band resources (or SRS bandwidth resources) with subcarrier numbers being odd; SRS even tree refers to: SRS frequency band resources with subcarrier numbers being even. Full frequency hopping means that the UE performs frequency hopping within the SRS frequency band resource range of the cell where the UE is located; non-full frequency hopping UEs comprise: partial-frequency hopping UEs and/or non-frequency hopping UEs; partial-frequency hopping means that the UE only performs frequency hopping within part of the SRS frequency band resource range of the cell where the UE is located; non-frequency hopping means that the SRS frequency band resource position in each transmission of the UE does not change.

The inventive concept of the present invention is: a system side setting different SRS transmission periods to correspond to different cycle shifts, and during a process of allocating SRS resources for user equipment (UE), setting a cycle shift adopted by the UE according to the SRS transmission period adopted by the UE.

Since different cycle shifts correspond to different phases, UEs with different configurations use different cycle shifts, which is equivalent to code division; furthermore, different cycle shifts are used by configuring UEs with different periods, which is equivalent to multiplexing UEs with different periods on the basis of code division and is a kind of dual multiplexing, whereby avoiding interference between UEs with different periods, and achieving simple and efficient SRS resource multiplexing with high-utilization ratio.

Said setting a cycle shift adopted by the UE according to the SRS transmission period adopted by the UE means that: the interval between cycle shifts respectively corresponding to UEs with closer configuration periods is larger, that is, the interval between cycle shifts respectively corresponding to any two UEs with closer periods is larger than or equal to the interval between cycle shifts respectively corresponding to any two UEs with farther periods.

After the cycle shift adopted by the UE is set for the UE, resources on an SRS odd tree or on an SRS even tree allocated for the UE are determined according to frequency hopping information of the UE within an SRS frequency band resource range of a cell where the UE is located, and the frequency hopping information of the UE is used to indicate whether the UE is a full-frequency hopping UE or a partial-frequency hopping UE, or a non-frequency hopping UE;

wherein, the step of determining resources on an SRS odd tree or on an SRS even tree allocated for the UE according to frequency hopping information of the UE comprises:

if the system side judges that UEs in the system are all full-frequency hopping UEs, or UEs in the system are all non-full frequency hopping UEs, determining resources on an SRS odd tree or on an SRS even tree allocated for the UE according to remaining SRS frequency band resources of the cell where the UE is located, specifically: if the system side judges that among the remaining SRS frequency band resources of the cell, the resources on the SRS odd tree are more than the resources on the SRS even tree, allocating the resources on the SRS odd tree for the UE; if among the remaining SRS frequency band resources of the cell, the resources on the SRS even tree are more than the resources on the SRS odd tree, allocating the resources on the SRS even tree for the UE;

if the system side judges that the system has both full-frequency hopping UEs and non-full frequency hopping UEs, allocating resources on different SRS trees for the full-frequency hopping UEs and non-full frequency hopping UEs respectively, comprising: allocating resources on an SRS even tree for the full-frequency hopping UEs, and allocating resources on an SRS odd tree for the partial-frequency hopping UEs and non-frequency hopping UEs; or, allocating resources on an SRS odd tree for the full-frequency hopping UEs, and allocating resources on an SRS even tree for the partial-frequency hopping UEs and non-frequency hopping UEs.

Preferably, the method further comprises: determining an SRS bandwidth of the UE, and after allocating the SRS tree (SRS odd tree or SRS even tree) to the UE, searching for available resources for the UE on the SRS tree allocated to the UE in any one of the following ways according to the SRS bandwidth of the UE: frequency division, frequency division and time division, frequency division and code division, and frequency division, time division and code division (the order is not limited), and allocating the available resources searched out to the UE.

Wherein, when available resources are searched by way of frequency division, searching is implemented according to different frequency bands, and when available resources are searched by way of time division, it is implemented according to different subframe offsets, and when available resources are searched by way of code division, it is implemented according to different cycle shifts.

The step of determining an SRS bandwidth of the UE comprises: allocating an SRS bandwidth to the UE according to channel quality of the UE, and preferably, allocating larger SRS bandwidths to the UEs with better channel quality.

Specifically, the way of frequency division comprises: on the SRS tree of the UE corresponding to a certain subframe offset, starting from a layer with the same SRS bandwidth as that of the UE, searching for idle resources on the SRS tree in a preset order according to the index of each node on the SRS tree, and if any idle resource is searched out, allocating the idle resource to the UE as available resource, and if no idle resource is searched out, continuing to search for idle resources by way of time division and/or code division.

Specifically, the way of code division comprises: on the SRS tree of the UE corresponding to a certain subframe offset, starting from a layer with the same SRS bandwidth as that of the UE, searching for non-idle resources on the SRS tree in a preset order according to the index of each node on the SRS tree, and the UE2 occupying the resource and the current UE having the same SRS bandwidth and different periods; if any non-idle resource is searched out, allocating the non-idle resource to the current UE as available resource; if no non-idle resource is searched out, continuing to search for non-idle resources by way of time division.

The above searching in a preset order may be the searching in an ascending order of node indices, or in a descending order of node indices, or in an order starting from the middle node index to the two directions of smaller and larger node indices, etc.

Specifically, the way of time division comprises: when no available resource is found by the way of frequency division and/or code division on the SRS tree of the UE corresponding to a certain subframe offset within the SRS transmission period, selecting a next subframe offset, and continuing to search for available resources by the way of frequency division and/or code division.

If no available resource that can be allocated to the UE is searched out, the SRS bandwidth of the UE is decreased, and available resources are searched for the UE with a newly determined SRS bandwidth in any one of the following ways: frequency division, frequency division and time division, frequency division and code division, and frequency division, time division and code division, and the available resources searched out are allocated to the UE.

In the present invention, the size of the SRS bandwidth of the UE is determined through the SINR measurement value of RACH, and then full bandwidth frequency hopping UEs and non-full bandwidth frequency hopping UEs are divided from each other by using odd tree and even tree, and different UEs are frequency-division multiplexed through different frequency bands and time-division multiplexed through different subframe offsets, and UEs with different SRS transmission periods are code-division multiplexed through different cycle shifts, which can avoid conflict and interference between UEs in the same cell when transmitting SRS, and also has a high utilization ratio of resources, and is applicable to both duplex modes of LTE FDD and TDD.

The apparatus for allocating SRS resources for implementing the above method comprises: a setting unit and a resource allocating unit, wherein:

the setting unit is configured to: set different SRS transmission periods to correspond to different cycle shifts;

the resource allocating unit is configured to: during a process of allocating SRS resources for user equipment (UE), set a cycle shift adopted by the UE according to the SRS transmission period adopted by the UE and a corresponding relationship between the SRS transmission period and the cycle shift set by the setting unit.

Preferably, the resource allocating unit is further configured to: after setting the cycle shift adopted by the UE for the UE, determine resources on an SRS odd tree or on an SRS even tree allocated for the UE according to frequency hopping information of the UE within an SRS frequency band resource range of a cell where the UE is located, wherein the frequency hopping information of the UE is used to indicate whether the UE is a full-frequency hopping UE or a partial-frequency hopping UE, or a non-frequency hopping UE.

Preferably, the resource allocating unit is further configured to: after allocating a SRS tree to the UE, search for available resources for the UE on the SRS tree allocated to the UE in any one of the following ways according to the SRS bandwidth of the UE: frequency division, frequency division and time division, frequency division and code division, and frequency division, time division and code division, and allocate the available resources searched out to the UE.

Preferably, the apparatus further comprises: a bandwidth setting unit configured to: allocate an SRS bandwidth to the UE according to channel quality of the UE, the SRS bandwidth allocated to the UE with better channel quality being larger, and send the SRS bandwidth allocated to the UE to the resource allocating unit.

Figure 2:
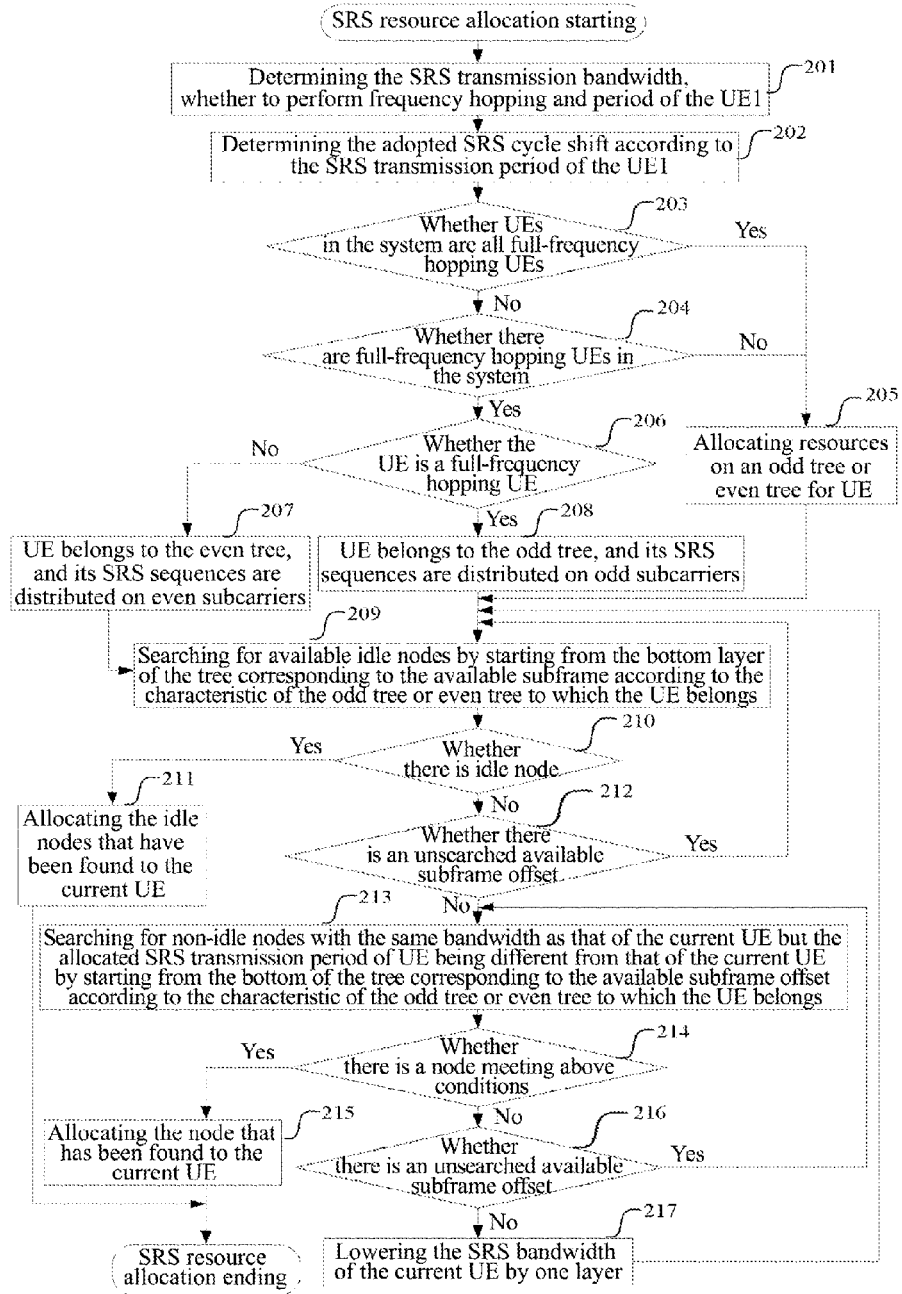
FIG. 2 is a flowchart of SRS resource allocation provided in an embodiment of the present invention.

The resource allocation process of the present invention will be described with reference to the drawings. As shown in FIG. 2, the resource allocation process comprises the following steps.

In step 201, the SRS transmission bandwidth, frequency hopping information (full-frequency hopping, partial-frequency hopping or non-frequency hopping) and SRS transmission period of the UE are determined;

Each type of SRS bandwidth configuration is divided into four layers, which are denoted by $B_{SRS} \in \{0,1,2,3\}$, wherein $B_{SRS}=0$ indicates the first layer, i.e. the layer with the maximum bandwidth, and $B_{SRS}=3$ is the layer with the minimum bandwidth. The size of the SRS bandwidth of the UE in the SRS bandwidth configuration of the cell where the UE is located can be determined through multiple UE SRS bandwidth allocation schemes.

This example only lists one usable UE SRS bandwidth allocation scheme, i.e. the SRS bandwidth allocated to a UE with a better channel quality is larger. Specifically, in the SRS bandwidth configuration of the cell where the UE is located, the bandwidth of the UE SRS is decided according to the SINR (Signal to Interference plus Noise Ratio) measurement values of the RACH (Random Access Channel) during the initial access of UE and three given SINR thresholds, and the smaller the SINR measurement value of UE RACH is, the larger the $B_{SRS}$ value of the SRS bandwidth configured correspondingly is, that is, the smaller the SRS bandwidth is. Three threshold parameters of SINR measurement values are SinrBad, SinrNormal, SinrGood, which respectively represents three thresholds for SINR quality from bad to good, wherein SinrBad<SinrNormal<SinrGood. The range of the value of the SINR is divided into four parts according to the three thresholds, which correspond to bandwidths of different layers respectively, for example:

1) when SINR≤SinrBad, then $B_{SRS}=3$, which indicates that the SRS bandwidth allocated to the UE is the bandwidth of a resource node on a fourth layer of the SRS tree in the cell where the UE is located;

2) when SinrBad<SINR≤SinrNormal, then $B_{SRS}=2$, which indicates that the SRS bandwidth allocated to the UE is the bandwidth of a resource node on a third layer of the SRS tree in the cell where the UE is located;

3) when SinrNormal<SINR≤SinrGood, then $B_{SRS}=1$, which indicates that the SRS bandwidth allocated to the UE is the bandwidth of a resource node on a second layer of the SRS tree in the cell where the UE is located;

4) when SinrGood<SINR, then $B_{SRS}=0$, which indicates that the SRS bandwidth allocated to the UE is the bandwidth of a resource node on a first layer of the SRS tree in the cell where the UE is located;

After the SRS bandwidth of the UE is determined, the frequency hopping information of the UE is determined according to the application scenario of the cell and SRS bandwidth resources, i.e. whether it needs to perform frequency hopping, and if so, whether it is full-bandwidth frequency hopping or partial-bandwidth frequency hopping. Finally, the SRS transmission period is determined according to the moving speed and channel characteristic of the UE. The determination of frequency hopping information and period can be both implemented according to the related art.

Herein, the frequency hopping bandwidth is indicated by $b_{hop}=\{0,1,2,3\}$ ($b_{hop}$ is a parameter in the standard, and is specially used to indicate the frequency hopping information of the UE), wherein, $b_{hop}=0$ means that the frequency hopping bandwidth is in the layer $B_0$, i.e. the bandwidth range of frequency hopping is in the layer with the maximum SRS bandwidth, and $b_{hop}=3$ means that the frequency hopping bandwidth is in the layer $B_3$, and the bandwidth range of frequency hopping is in the layer with the minimum SRS bandwidth, i.e. definitely without frequency hopping. When $b_{hop}<B_{SRS}$, the UE performs frequency hopping, while when $b_{hop}\geq B_{SRS}$, the UE doesn't.

In this example, it is designed such that the related parameters of the UE for transmitting SRS sequences in the first step, while in other examples, it is not limited thereto, as long as the parameters can be obtained before usage.

In step 202, the cycle shift adopted by the UE in transmission is determined according to the SRS transmission period of the UE;

Since it is regulated in the LTE protocol that the SRS sequence can use 8 types of cycle shifts, the phase of the cycle shift in the frequency domain $$\alpha = 2\pi \frac{n_{SRS}^{CS}}{8},$$

wherein $n_{SRS}^{CS}=0,1,2,3,4,5,6,7$. The inter-correlation between SRS sequences with different phases is 0. Therefore, it is considered that UEs with different transmission periods adopt different cycle shift phases to transmit SRS sequences.

For all UEs, 8 UEs with different SRS transmission periods are multiplexed by using the 8 cycle shift phases of SRS sequences, such that the same SRS resource tree can be allocated to UEs with different SRS transmission periods, i.e. one node of the odd tree or even tree in the SRS tree can be multiplexed to 8 UEs with different periods and same bandwidth, thereby improving the capacity of the SRS resources; moreover, since cycle shift phases are different, transmission on the same subframe offset will not cause conflict, which may give rise to interference.

Preferably, the corresponding relationship between 8 cycle shift phases and 8 SRS transmission periods may adopt the following scheme:

The cycle shift corresponding to a UE with a period of 2 ms is $n_{SRS}^{CS}=0$, the cycle shift corresponding to a UE with a period of 5 ms is $n_{SRS}^{CS}=4$, the cycle shift corresponding to a UE with a period of 10 ms is $n_{SRS}^{CS}=6$, the cycle shift corresponding to a UE with a period of 20 ms is $n_{SRS}^{CS}=2$, the cycle shift corresponding to a UE with a period of 40 ms is $n_{SRS}^{CS}=5$, the cycle shift corresponding to a UE with a period of 80 ms is $n_{SRS}^{CS}=3$, the cycle shift corresponding to a UE with a period of 160 ms is $n_{SRS}^{CS}=7$, and the cycle shift corresponding to a UE with a period of 320 ms is $n_{SRS}^{CS}=1$. Such a configuration takes into consideration that the closer the transmission periods are, the number of occurrences of collision between SRS signals of UEs with different periods is larger; the farther the transmission periods are, the number of occurrences of collision between SRS signals of UEs with different periods is smaller. In order to reduce the probability of occurrence of such case as much as possible, the interval between cycle shifts corresponding to UEs with close periods are designed as large as possible in this example.

It becomes obvious to understand the difficulty confronted in SRS bandwidth allocation in a complex system when referring to the above example of the corresponding relationship between the periods and cycle shifts. Of course, it needs to point out that the above corresponding relationship is only a simple example under the design concept of the present invention, and it cannot hence be comprehended that there is only one corresponding relationship between the periods and cycle shifts in the bandwidth allocation method of the present invention. A person skilled in the art can make various deformations according to the above design concept. For example, in the above example, any two adjacent cycle shifts can be replaced with each other, for example: the cycle shift corresponding to a UE with a period of 2 ms is $n_{SRS}^{CS}=1$, and the cycle shift corresponding to a UE with a period of 320 ms is $n_{SRS}^{CS}=0$; or, the cycle shift corresponding to a UE with a period of 10 ms is $n_{SRS}^{CS}=5$, and the cycle shift corresponding to a UE with a period of 40 ms is $n_{SRS}^{CS}=6$, and so on. Other examples will not be listed one by one here.

Setting cycle shifts is not limited to being implemented in this step, and it can also be implemented after SRS frequency band resources are allocated to the UE, provided that they are determined before data transmission.

In step 203, whether the UEs in the system are all full-frequency hopping UEs is judged, if not, step 204 is executed, and if yes, step 205 is executed;

in step 204, whether there are full-frequency hopping UEs in the system is judged, if not, step 205 is executed, and if yes, step 206 is executed;

This step is optional. It is designed in the present invention that full-frequency hopping, partial-frequency hopping and non-frequency hopping are distinguished by means of odd and even trees, and if it is judged that there is no full-frequency hopping users in the system, there is no need to be limited to the odd tree or even tree when allocating SRS bandwidth to the UE.

In step 25, resources on an SRS odd tree or on an SRS even tree allocated for the UE are determined according to the remaining SRS frequency band resources of the cell where the UE is located, and step 209 is executed;

preferably, the SRS tree allocated to the UE may be determined according to the number of resources on the odd tree and even tree, and among the remaining SRS frequency band resources of the cell where the UE is located, if the resources on the SRS odd tree are more than the resources on the SRS even tree, the resources on the SRS odd tree are allocated to the UE, and if the resources on the SRS even tree are more than the resources on the SRS odd tree, the resources on the SRS even tree are allocated to the UE.

In step 206, whether the UE is a full-frequency hopping UE is judged, if not, step 207 is executed, and if yes, step 208 is executed;

In step 207, resources belonging to the even tree are allocated to the UE, and its SRS sequences are distributed on even subcarriers, and step 209 is executed;

In step 208, resources belonging to the odd tree are allocated to the UE, and its SRS sequences are distributed on odd subcarriers, and step 209 is executed.

In step 209, the current available subframe offset of the UE is determined, available resources, i.e. whether there are idle nodes, are searched by starting from a layer with the same bandwidth as that of the current UE in the SRS tree (if an odd tree is allocated to the UE, the SRS tree here is an SRS odd tree, and if an even tree is allocated to the UE, the SRS tree here is an SRS even tree) corresponding to the subframe offset.

The subframe offset number is relative to the cell SRS specialized subframe configuration period, and the subframe offset number of the first subframe in this period is 0, the subframe offset number of the second subframe is 1, and so forth. In all subframe offsets during the period, the configured subframe offset available in the cell where the UE is located is the current available subframe offset of UE. The starting point for searching in this step may be any node on the SRS tree, which is not limited to the bottom of the SRS tree. The subframe offset for starting searching may also be any available subframe offset, which is not limited to the first available subframe offset.

The conditions that must be satisfied for searching for idle nodes that can be allocated to the current UE are:

for the odd tree, the premise that its parent node can be allocated to the UE is that none of its child nodes has been allocated yet, that is, as long as any one of the child nodes of the parent node has been allocated, this parent node cannot be allocated as a whole, but its child nodes, as a whole, are allocated to a UE with the same bandwidth as that of the child nodes;

as for the odd tree, the following frequency band allocation principle should be met: partial bandwidth frequency hopping UEs (including UEs with the frequency hopping bandwidth being the second layer and third layer) and non-frequency hopping UEs are divided from each other in the frequency band by way of frequency division, and in order to avoid conflict of SRS transmission bandwidth overlapping of different UEs, if one node in the SRS even tree is allocated to a UE with the frequency hopping bandwidth being the second layer, the UEs allocated under the second layer bandwidth node corresponding to this node must be all UEs with the frequency hopping bandwidth being the second layer; similarly, if one node in the SRS even tree is allocated to a UE with the frequency hopping bandwidth being the third layer, the UEs allocated under the third layer bandwidth node corresponding to this node must be all UEs with the frequency hopping bandwidth being the third layer; for non-frequency hopping UEs, the condition that the nodes in the SRS even tree allocated to the UEs should satisfy is that other child nodes of its parent node cannot be allocated to the UEs with the frequency hopping bandwidth being the layer of its parent node.

The above condition is the regulation based on the allocation method of this example. Specifically, in this example, full-frequency hopping UEs are configured on the SRS odd tree, and partial-frequency hopping UEs and non-frequency hopping UEs are configured on the SRS even tree. The above condition is designed based on this principle. If in other examples, if full-frequency hopping UEs are configured on the SRS even tree, and partial-frequency hopping UEs and non-frequency hopping UEs are configured on the SRS odd tree, then the above condition for odd tree should correspond to new SRS even tree, and the above condition for even tree should correspond to new SRS odd tree.

If all UEs in the cell are configured on the odd tree SRS resources, only the above condition corresponding to odd tree needs to be considered, and the above even tree condition does not need to be considered; likewise, if all UEs in the cell are configured on the even tree SRS resources, the above odd tree condition does not need to be considered.

In step 210, whether there are available resources is judged, if yes, step 211 is executed, and if no, step 212 is executed;

In step 211, the idle nodes that have been found are allocated to the UE, and SRS resource allocation is over;

at this moment, the SRS resources allocated to the UE comprise frequency band resources and time domain resources (subframe offsets).

In step 212, whether there is a next unsearched available subframe offset is judged, if yes, the available subframe offset is used as the current available subframe offset, and return to step 209; if no, step 213 is executed.

As described above, the total number of available SRS subframe offsets during one configuration period can be determined according to the selected cell SRS specialized subframe configuration period. One subframe offset in the time domain corresponds to a section of SRS resources, i.e. SRS tree, on the frequency domain, and the capacity of SRS resources can be further extended through time division multiplexing of different subframe offsets.

In step 213, the current available subframe offset of the UE is determined, and non-idle nodes are searched by starting from a layer with the same bandwidth as that of the current UE in the SRS tree (if an odd tree is allocated to the UE, the SRS tree here is an SRS odd tree, and if an even tree is allocated to the UE, the SRS tree here is an SRS even tree) corresponding to the subframe offset, and the UE occupying the node and the current UE have the same SRS bandwidth and different periods;

in step 214, whether a node meeting the conditions is found is judged, and if yes, step 215 is executed, and if no, step 216 is executed;

in step 215, the node meeting the conditions that has been found is allocated to the UE, and the SRS resource allocation is over;

at this moment, the SRS resources allocated to the UE comprise frequency band resources and time domain resources (subframe offsets).

In step 216, whether there is a next unsearched available subframe offset is judged, if yes, the available subframe offset is used as the current available subframe offset, and return to step 213; if no, step 217 is executed;

Said "unsearched available subframe offset" in this step refers to available subframe offsets that have not been searched according to the conditions in step 213.

In step 217, the SRS bandwidth of the current UE is lowered by one layer, return to step 209;

The SRS bandwidth of the current UE is lowered by one level, i.e. one layer, and allocation is continued by starting from step 209, until available SRS resources are found. It is impossible that the SRS bandwidth of the UE by now is the fourth layer, since there is no remaining SRS frequency band resources and the system will not access UEs to which SRS resources need to be allocated.

Figure 3:
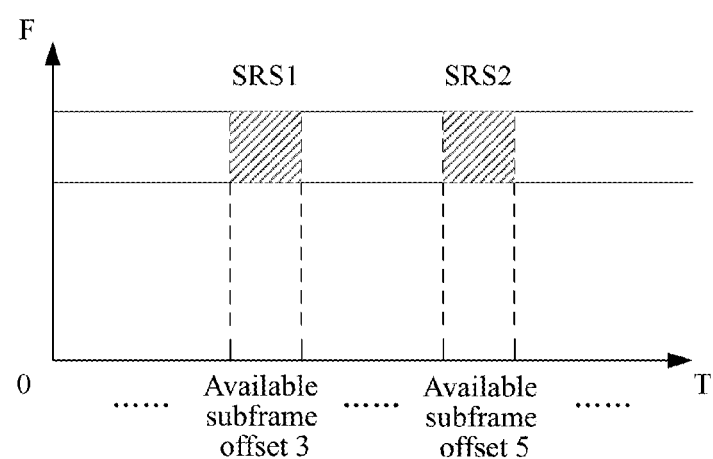
FIG. 3 is a demonstration diagram of SRS resource allocation provided in an embodiment of the present invention.

Description will be made exemplarily. It is assumed that available subframe offsets of a certain UE1 are subframe offset 3 and subframe offset 5, and there is a section of corresponding SRS resources on the frequency domain for each subframe offset. As shown in FIG. 3, subframe offset 3 corresponds to SRS1, and subframe offset 5 corresponds to SRS2. Each SRS has the tree structure as shown in FIG. 1.

It is assumed that the SRS transmission period of UE1 is 2 ms, and the SINR of the UE1 is less than or equal to SinrBad, then the SRS bandwidth of the UE is the bandwidth value (4 RBs) of layer $B_3$ as shown in FIG. 1. And this UE is a partial-frequency hopping UE, and according to the above example, the resources allocated to the UE is SRS even tree. If searching is implemented in an ascending order, firstly searching is started from layer $B_3$ of the even tree of SRS1 corresponding to the available subframe offset 3, and idle nodes, i.e. frequency band resources that are not occupied by any UE, are searched from bottom to the top. If no node is searched out, then searching is started from layer $B_3$ of the even tree of SRS2 corresponding to the available subframe offset 5, and idle nodes are searched from bottom to the top. If no node is still not searched out, code division multiplexing is used, i.e. allowing UEs with the same bandwidth and different periods to multiplex a section of frequency band resources. Searching is restarted from layer $B_3$ of the even tree of SRS1 corresponding to the available subframe offset 3, and non-idle nodes, i.e. frequency band resources that have been occupied by other UE, are searched from bottom to the top. When the bandwidth of UE2 occupying the frequency band resources is 4 RB, and the SRS transmission period is 10 ms (meeting the condition of being not equal to 2 ms), the section of resources are allocated to UE1, i.e. allowing UE1 and UE2 to multiplex this section of frequency band resources. The cycle shift adopted by UE1 for data transmission is $n_{SRS}^{CS}=0$, and the cycle shift adopted by UE2 is $n_{SRS}^{CS}=6$. Data transmission of two UEs will not cause conflict.

The present invention is designed to distinguish non-frequency hopping from frequency hopping by using the tree structure of SRS. The odd tree in the SRS tree is to be allocated to the UEs performing frequency hopping on the entire SRS bandwidth of cell, while the even tree in the SRS tree is to be allocated to the UEs performing frequency hopping on part of the SRS bandwidth of cell and UEs which do not perform frequency hopping. If there is no full-bandwidth frequency hopping UE, the odd tree can also be allocated to partial-bandwidth frequency hopping UEs, and if the UEs are all full-bandwidth frequency hopping UEs, the odd tree can also be allocated to full-bandwidth frequency hopping UEs.

Odd-even division and frequency band division in the present invention can avoid occurrence of conflict of bandwidth overlapping between full-bandwidth frequency hopping UEs and partial-bandwidth frequency hopping UEs and non-frequency hopping UEs after frequency hopping, thereby avoiding occurrence of interference, and improving the system performance. In other examples, other division modes can be adopted, for example, the odd tree is to be allocated to the UEs performing frequency hopping on part of the SRS bandwidth of cell and UEs which do not perform frequency hopping, while the even tree is to be allocated to the UEs performing frequency hopping on the entire SRS bandwidth of cell, as long as it is ensured that no conflict will occur.

In the above example, frequency division multiplexing is implemented through steps 209-210; time division multiplexing is implemented through the cycle process of step 212 and step 215; code division multiplexing is implemented through steps 213-215. The order of the above frequency division, time division and code division is not limited to the order in the example of the present invention, and it may be amended as necessary, for example, firstly code division and then time division, etc.

INDUSTRIAL APPLICABILITY

The present invention provides a method and apparatus for allocating SRS resources in a LTE system, so as to achieve simple and effective SRS resource multiplexing with high utilization ratio among UEs with different periods. With the SRS resource multiplexing method as described in the present invention, there is no conflict in the SRS resources allocated among UEs, i.e. interference will not be caused for each other, and UEs with different SRS transmission periods can be simply multiplexed together without occurrence of conflict; the process of resource multiplexing is also very simple, the utilization ratio of the entire SRS resources is also very high, and the method can be applied to both of the two Duplex modes, FDD and TDD, in the LTE system.

What is claimed is:

1. A method for allocating Sounding Reference Signal (SRS) resources in a Long Term Evolution (LTE) system, comprising:

a system side setting different SRS transmission periods to correspond to different cycle shifts, and during a process of allocating SRS resources for user equipment (UE), setting the cycle shift adopted by the UE according to the SRS transmission period adopted by the UE;

wherein determining resources on an SRS odd tree or on an SRS even tree allocated for the UE according to frequency hopping information of the UE within an SRS frequency band resource range of a cell where the UE is located, the frequency hopping information of the UE being for indicating whether the UE is a full-frequency hopping UE or a partial-frequency hopping UE, or a non-frequency hopping UE; and wherein the SRS odd tree refers to SRS frequency band resources with subcarrier numbers being odd; the SRS even tree refers to SRS frequency band resources with subcarrier numbers being even; the full-frequency hopping means that the UE performs frequency hopping within the SRS frequency band resource range of the cell where the UE is located; the partial-frequency hopping means that the UE only performs frequency hopping within part of the SRS frequency band resource range of the cell where the UE is located; the non-frequency hopping means that a SRS frequency band resource position in each transmission of the UE does not change.

2. The method according to claim 1, wherein, in the step of setting the cycle shift adopted by the UE according to the SRS transmission period adopted by the UE:
for UEs with closer SRS transmission periods, an interval for configuring corresponding cycle shifts thereof is larger.

3. The method according to claim 1, wherein, the step of determining resources on an SRS odd tree or on an SRS even tree allocated for the UE according to frequency hopping information of the UE comprises:
if the system side judges that UEs in a system are all the full-frequency hopping UEs, or UEs in the system are all non-full frequency hopping UEs, determining resources on the SRS odd tree or on the SRS even tree allocated for the UE according to remaining SRS frequency band resources of the cell where the UE is located; the non-full frequency hopping UEs comprise: the partial-frequency hopping UEs and/or the non-frequency hopping UEs;
if the system side judges that the system has both the full-frequency hopping UEs and the non-full frequency hopping UEs, allocating resources on different SRS trees for the full-frequency hopping UEs and non-full frequency hopping UEs respectively.

4. The method according to claim 3, wherein, said allocating resources on different SRS trees for the full-frequency hopping UEs and non-full frequency hopping UEs respectively means:
allocating resources on the SRS even tree for the full-frequency hopping UEs, and allocating resources on the SRS odd tree for the partial-frequency hopping UEs and non-frequency hopping UEs; or,
allocating resources on the SRS odd tree for the full-frequency hopping UEs, and allocating resources on the SRS even tree for the partial-frequency hopping UEs and non-frequency hopping UEs.

5. The method according to claim 3, wherein, said determining resources on the SRS odd tree or on the SRS even tree allocated for the UE according to remaining SRS frequency band resources of the cell where the UE is located means:
if the system side judges that among the remaining SRS frequency band resources of the cell, the resources on the SRS odd tree are more than the resources on the SRS even tree, allocating the resources on the SRS odd tree for the UE; if among the remaining SRS frequency band resources of the cell, the resources on the SRS even tree are more than the resources on the SRS odd tree, allocating the resources on the SRS even tree for the UE.

6. The method according to claim 1, further comprising:
determining an SRS bandwidth occupied by the UE; after allocating a SRS tree to the UE, searching for available resources for the UE on the SRS tree allocated to the UE in any one of following ways according to the SRS bandwidth of the UE: frequency division, frequency division and time division, frequency division and code division, and frequency division, time division and code division; allocating the available resources searched out to the UE.

7. The method according to claim 6, wherein, said searching for available resources for the UE on the SRS tree allocated to the UE by way of frequency division comprises:
on the SRS tree of the UE corresponding to a certain subframe offset, starting from a layer with the same SRS bandwidth as that of the UE, searching for idle resources on the SRS tree in a preset order according to an index of each node on the SRS tree, and if any idle resource is searched out, using the idle resource as the available resource.

8. The method according to claim 7, wherein, said searching for available resources for the UE on the SRS tree allocated to the UE by way of frequency division and code division comprises:
if no available resource is searched out by way of the frequency division, then,
on the SRS tree of the UE corresponding to a certain subframe offset, starting from a layer with the same SRS bandwidth as that of the UE, searching for non-idle resources on the SRS tree in the preset order according to the index of each node on the SRS tree, and the UE occupying the resources and current UE having the same SRS bandwidth and different periods, and different periods corresponding to different cycle shifts; if the non-idle resource is searched out, using the non-idle resource as the available resource.

9. The method according to claim 8, wherein, said searching for available resources for the UE on the SRS tree allocated to the UE by way of frequency division and time division comprises:
when no available resource is found by way of the frequency division on the SRS tree of the UE corresponding to a certain subframe offset, selecting a next subframe offset, and continuing to search for the available resources by way of the frequency division and/or code division;
said searching for available resources for the UE on the SRS tree allocated to the UE by way of frequency division, time division and code division comprises:
when no available resource is found by way of the frequency division and code division on the SRS tree of the UE corresponding to a certain subframe offset, selecting a next subframe offset, and continuing to search for the available resources by way of the frequency division and/or code division.

10. The method according to claim 7, wherein, said searching for available resources for the UE on the SRS tree allocated to the UE by way of frequency division and time division comprises:
when no available resource is found by way of the frequency division on the SRS tree of the UE corresponding to a certain subframe offset, selecting a next subframe offset, and continuing to search for the available resources by way of the frequency division and/or code division;
said searching for available resources for the UE on the SRS tree allocated to the UE by way of frequency division, time division and code division comprises:
when no available resource is found by way of the frequency division and code division on the SRS tree of the UE corresponding to a certain subframe offset, selecting a next subframe offset, and continuing to search for the available resources by way of the frequency division and/or code division.

11. The method according to claim 6, further comprising:
if no available resource that can be allocated to the UE is searched out, decreasing the SRS bandwidth of the UE, and searching for available resources for the UE with a newly determined SRS bandwidth in any one of following ways: frequency division, frequency division and time division, frequency division and code division, and frequency division, time division and code division, and allocating the available resources searched out to the UE.

12. The method according to claim 6, wherein, the step of determining an SRS bandwidth occupied by the UE comprises:
allocating the SRS bandwidth to the UE according to channel quality of the UE, and the SRS bandwidth allocated to the UE with better channel quality being larger.

13. The method according to claim 12, wherein, the step of the SRS bandwidth allocated to the UE with better channel quality being larger comprises:
setting thresholds of Signal to Interference plus Noise Ratio (SINR) measurement values: SinrBad, SinrNormal, SinrGood, wherein SinrBad<SinrNormal<SinrGood, and comparing the SINR measurement value of the UE with the thresholds so as to determine the SRS bandwidth thereof: $B_{SRS}$ is for indicating a number of each layer of the SRS tree of the cell where the UE is located;
when SINR≤SinrBad, then $B_{SRS}$=3, which indicates that the SRS bandwidth allocated to the UE is a bandwidth of a resource node on a fourth layer of the SRS tree in the cell where the UE is located; when SinrBad<SINR≤SinrNormal, then $B_{SRS}$=2, which indicates that the SRS bandwidth allocated to the UE is a bandwidth of a resource node on a third layer of the SRS tree in the cell where the UE is located;
when SinrNormal<SINR≤SinrGood, then $B_{SRS}$=1, which indicates that the SRS bandwidth allocated to the UE is a bandwidth of a resource node on a second layer of the SRS tree in the cell where the UE is located;
when SinrGood<SINR, then $B_{SRS}$=0, which indicates that the SRS bandwidth allocated to the UE is a bandwidth of a resource node on a first layer of the SRS tree in the cell where the UE is located; wherein, the bandwidth of the resource node on the first layer>the bandwidth of the resource node on the second layer>the bandwidth of the resource node on the third layer>the bandwidth of the resource node on the fourth layer.

14. An apparatus for allocating Sounding Reference Signal (SRS) resources in a Long Term Evolution (LTE) system, comprising at least one processor executing a setting unit and a resource allocating unit, wherein:
the setting unit configured to: set different SRS transmission periods to correspond to different cycle shifts; and
the resource allocating unit configured to: during a process of allocating SRS resources for user equipment (UE), set the cycle shift adopted by the UE according to the SRS transmission period adopted by the UE and a corresponding relationship between the SRS transmission period and the cycle shift set by the setting unit;
wherein the resource allocating unit is further configured to: after setting the cycle shift adopted by the UE for the UE, determine resources on an SRS odd tree or on an SRS even tree allocated for the UE according to frequency hopping information of the UE within an SRS frequency band resource range of a cell where the UE is located, wherein the frequency hopping information of the UE is for indicating whether the UE is a full-frequency hopping UE or a partial-frequency hopping UE, or a non-frequency hopping UE; and
wherein the SRS odd tree refers to SRS frequency band resources with subcarrier numbers being odd; the SRS even tree refers to SRS frequency band resources with subcarrier numbers being even; the full-frequency hopping means that the UE performs frequency hopping within the SRS frequency band resource range of the cell where the UE is located; the partial-frequency hopping means that the UE only performs frequency hopping within part of the SRS frequency band resource range of the cell where the UE is located; the non-frequency hopping means that a SRS frequency band resource position in each transmission of the UE does not change.

15. The apparatus according to claim 14, wherein,
the resource allocating unit is further configured to: after allocating a SRS tree to the UE, search for available resources for the UE on the SRS tree allocated to the UE in any one of following ways according to SRS bandwidth of the UE: frequency division, frequency division and time division, frequency division and code division, and frequency division, time division and code division, and allocate the available resources searched out to the UE.

16. The apparatus according to claim 15, further comprising a bandwidth setting unit, which is configured to: allocate the SRS bandwidth to the UE according to channel quality of the UE, the SRS bandwidth allocated to the UE with better channel quality being larger, and send the SRS bandwidth allocated to the UE to the resource allocating unit.

* * * * *